US012778835B2

(12) United States Patent
Lau et al.

(10) Patent No.: US 12,778,835 B2
(45) Date of Patent: Nov. 3, 2026

(54) EYESIGHT TRAINING DEVICE AND METHOD THEREFOR

(71) Applicants: Chun Ho Lau, Shanghai (CN); Chun Put Lau, Hong Kong (CN)

(72) Inventors: Chun Ho Lau, Shanghai (CN); Chun Put Lau, Hong Kong (CN)

( * ) Notice: Subject to any disclaimer, the term of this patent is extended or adjusted under 35 U.S.C. 154(b) by 586 days.

(21) Appl. No.: 18/264,549

(22) PCT Filed: Feb. 8, 2022

(86) PCT No.: PCT/CN2022/075542
§ 371 (c)(1),
(2) Date: Aug. 7, 2023

(87) PCT Pub. No.: WO2022/166989
PCT Pub. Date: Aug. 11, 2022

(65) Prior Publication Data

US 2024/0041691 A1 Feb. 8, 2024

(30) Foreign Application Priority Data

Feb. 8, 2021 (CN) ........................ 202110180371.2

(51) Int. Cl.
*A61H 5/00* (2006.01)

(52) U.S. Cl.
CPC ..... *A61H 5/005* (2013.01); *A61H 2201/1604* (2013.01); *A61H 2201/5043* (2013.01); *A61H 2205/024* (2013.01)

(58) Field of Classification Search
CPC .......................... A61H 5/005; A61H 2205/024
(Continued)

(56) References Cited

U.S. PATENT DOCUMENTS 4,889,422 A * 12/1989 Pavlidis ................. G16H 15/00 128/898
6,606,577 B1 * 8/2003 Fukuhara ............... A61B 5/161 702/183
(Continued)

FOREIGN PATENT DOCUMENTS

CN 103536271 1/2014
CN 204698962 10/2015
(Continued)

OTHER PUBLICATIONS

PCT International Application No. PCT/CN22/75542, International Search Report and Written Opinion of the International Searching Authority, dated Apr. 26, 2022, 8 pages.

*Primary Examiner* — Pinping Sun
*Assistant Examiner* — Andrew R Wright
(74) *Attorney, Agent, or Firm* — Bayramoglu Law Offices LLC

(57) ABSTRACT

An eyesight training device and a method therefor are provided. The device includes a binocular visual-field separation device, including a double-separation plate assembly and an adjustable unit, the double-separation plate assembly including two separation plates which are movably connected to form an included angle, and the adjustable unit is used for adjusting the included angle between the two separation plates; and a display screen, wherein the double-separation plate assembly separates the display screen into a left visual field and a right visual field. The method includes: arranging two separation plates at a near-screen side; providing at least one movable training visual target at each of the left and right sides of the separated display screen, respectively; when divergent fusional ability of the trainee's brain visual center reaches its limit, the two training visual
(Continued)

targets return along original paths to their starting positions, respectively, and repeating the process at least twice.

8 Claims, 9 Drawing Sheets

(58) Field of Classification Search
USPC .......................................................... 351/203
See application file for complete search history.

(56) References Cited

U.S. PATENT DOCUMENTS

| | | | |
|---|---|---|---|
| 7,393,102 B2 * | 7/2008 | Horie ....................... | A61H 5/00 351/200 |
| 7,699,466 B2 | 4/2010 | Hayakawa et al. | |
| 9,536,450 B2 * | 1/2017 | Kimura ................ | G09B 19/167 |
| 10,264,964 B1 | 4/2019 | Berme et al. | |
| 11,363,948 B2 * | 6/2022 | Fujikado .................. | A61B 3/18 |
| 2004/0161730 A1 * | 8/2004 | Urman ................... | G09B 19/00 434/236 |
| 2006/0164597 A1 | 7/2006 | Hayakawa et al. | |
| 2015/0212342 A1 * | 7/2015 | Giraudet .............. | A61B 5/1121 351/204 |
| 2019/0290529 A1 * | 9/2019 | Park ........................ | A61F 9/022 |
| 2020/0221943 A1 * | 7/2020 | Kobayashi ............. | A61B 3/032 |
| 2020/0329961 A1 * | 10/2020 | Oz ........................... | A61B 3/08 |
| 2020/0333258 A1 * | 10/2020 | Knowles .............. | G01N 21/896 |
| 2021/0173474 A1 * | 6/2021 | Sztuk ...................... | G06F 3/013 |

FOREIGN PATENT DOCUMENTS

| | | |
|---|---|---|
| CN | 205459719 | 8/2016 |
| CN | 209236758 | 8/2019 |
| CN | 210750156 | 6/2020 |
| CN | 111407612 | 7/2020 |
| CN | 212018445 U * | 11/2020 |
| CN | 112807200 | 5/2021 |
| CN | 216168714 | 4/2022 |
| JP | H11-235314 | 8/1999 |
| JP | 2012-100759 | 5/2012 |
| WO | 2012081244 | 6/2012 |

* cited by examiner

EYESIGHT TRAINING DEVICE AND METHOD THEREFOR

CROSS REFERENCE TO RELATED APPLICATION

This application is a national stage application of International Patent Application No. PCT/CN2022/075542, filed on Feb. 8, 2022, which claims priority of the Chinese Patent Application No. 202110180371.2, filed on Feb. 8, 2021, both of which are incorporated by references in their entities.

TECHNICAL FIELD

The present disclosure mainly relates to the field of eyesight training for improving poor eyesight and inhibiting myopia progression, in particular to an eyesight training device and a method therefor.

BACKGROUND

It is generally known that, when the muscle tension of the intraocular ciliary muscle, which is responsible for focusing accommodation, is at the most relaxed physiological level, and the distant sceneries are all focused in front of the central retina, it is defined as myopia, which also results in blurred and subnormal eyesight, thereby forming poor eyesight.

When a person looks at a close-up visual target, the center of a near-reflex pathway in the midbrain will be activated, resulting in three changes:

(1) Reflex contraction of bilateral pupils.

(2) The adductive extraocular muscle in both eyes contracts to keep the visual axes of both eyes overlapping on the same visual target to avoid diplopia (Herring's law, maintaining single version of both eyes).

(3) The contraction of the ciliary muscle makes the lens surface more convex and the anterior-posterior diameter larger, thus increasing the accommodation to keep the sceneries being focused on the central retina to get a clear visual image. When the eyes change to look at a distant visual target (at a distance of 6 meters or more), the center of the near-reflex pathway in the midbrain will be inhibited. At this time, the pupil, the adductive extraocular muscle, the ciliary muscle, the lens surface radian and the anterior-posterior diameter of both eyes will relax and return to normal, thereby returning to the normal relaxed physiological level when looking at the distance.

Acquired myopia is generally caused by reading or doing homework at a close distance for a long time. When reading or doing homework at a close distance for a long time, the visual target and visual image are presented at a close distance, and the center of the near-reflex pathway is under long-term activation to increase and maintain the accommodation of both eyes, at this time, the intraocular ciliary muscle and the external intorsion muscle need to be kept in a contracted state for a long time. Over time, when the center of the near-reflex pathway needs to be inhibited when looking at the distance, although both eyes no longer converge and the pupils no longer contract, the ciliary muscle may not completely return to the relaxed state from the contracted state, resulting in the maintenance of part of the increased accommodation (accommodation spasm) when looking at the near object. At this time, although the eyes are looking at the distant visual target, as the maintenance of part of the increased accommodation, the visual target and the visual image are not focused on the retina, resulting in poor eyesight such as blurred vision and decreased eyesight.

The accommodation spasm caused by the continuous contraction of the ciliary muscle produces what is called pseudomyopia clinically. If this situation continues, it can cause excessive extension of the eye's axial length at a rate beyond the normal growth rate, resulting in true myopia. When the accommodation spasm is not relaxed, pseudomyopia can exist continually, and at the same time it will lead to more severe true myopia. Clinically, that is a common phenomenon and a high myopia prevalence among students and the spherical dioptric power of myopia increasing easily by one or two diopters per year.

Looking at the near object for a long time means that the visual axis of both eyes is adducted for a long time. This position involves long-term activation of the extraocular muscle responsible for adduction. According to Sherrington's law, the extraocular muscle responsible for abduction is inhibited at the same time. Over time, the extraocular muscle responsible for adduction will be over-strengthened (becoming stronger, and the muscle tone becoming stronger as well) and easily activated, while the extraocular muscle responsible for abduction will be over-weakened (becoming weaker, and the muscle tone being weakened). In this way, the muscle tones of the two groups of antagonistic extraocular muscles can become unbalanced and tend to tilt towards adduction, which will boost the occurrence and progress of pseudomyopia and true myopia in a vicious circle.

At present, myopia treatment and correction methods used by eye doctors and optometrists include the following categories.

First, the physical or invasive means to correct ametropia in myopia include:

1. Wearing myopia lenses (non-invasive) or contact lenses (invasive).

The lens used to correct myopia ametropia is a concave lens, which will move the center and peripheral focal points of the central and peripheral visual images backward after refraction by cornea and lens. The goal is to focus the distant central visual image, but at the same time, it will move the distant peripheral visual image more backward, thus aggravating the hyperopic defocus phenomenon of peripheral retina.

More disadvantageously, when myope wearing concave lenses correcting myopia to ametropia reads and does homework at a close distance, because at this time the central and peripheral visual images are closer to the eyes, the foci of the central and peripheral visual images will move more backward, resulting in hyperopic ametropia. At this time, unfocused central and peripheral visual images will stimulate the brain visual center. In order to get a relatively clearer visual image, the brain visual center has to activate the center of the near-reflex pathway in the midbrain, so that the ciliary muscle will contract (long-term contraction can cause ciliary muscle spasms), making the lens surface more convex and the anterior-posterior diameter larger (even more so in the presence of ciliary muscle spasms), resulting in increased accommodation (even more so in the presence of ciliary muscle spasms) to focus the visual image, and generally only the central visual image is focused, as the focus of the peripheral visual image needs even stronger accommodation. When doing so, the focus of the central visual image will shift to the front of central retina, resulting in a new round of myopia ametropia. This is why wearing a concave lens to correct myopia ametropia can easily cause and aggravate the occurrence and progress of pseudomyopia and true myopia, leading to the rapid increasing of the spherical dioptric power of myopia, which can increase easily by one or two diopters per year.

2. For the OK lens (invasive), the cornea is easily damaged and can be infected and scarred, resulting in permanent loss of eyesight. Keratoconus can occur.

3. Use of atropine eyedrop as mydriasis and ciliary muscle paralysis drug (invasive).

The disadvantages of such mydriasis are as follows.

(1) The enlarged pupil allows a lot of peripheral residual light originally blocked by iris to enter the eye, resulting in light damage to retina and interfering the clarity of the visual images.

(2) A lot of light from the visual targets and the visual images enters and refracts through the paracentral area of the lens. Because the spherical dioptric power in the central area of the lens is different from that in the paracentral area, resulting in astigmatism and blurred visual targets and visual images.

(3) Atropine has a long half-life, so that the pupil is often kept enlarged for about two to three weeks after taking the drug, resulting in many nuisances, including photophobia.

In addition, atropine is toxic with lots of side effects, such as: tachycardia, fever, dry eyes and dry mouth; after long-term use, lots of harmful ultraviolet rays enter the eye, resulting in retinal and macular degeneration. That is why the atropine eyedrop concentration has been decreasing over the past decades. However, toxicity remains and atropine eyedrop is not effective in inhibiting myopia occurrence and progression. The toxicity of the latest atropine eyedrop with an ultra-low concentration (0.01%) remains to be observed, but the therapeutic effect is not convincing.

4. Laser correction surgery (invasive, including the removal of corneal tissues) is not suitable for not fully grown eyes under the age of 18.

Surgery often results in glare and corneal dryness sensation and can cause infection. Myopia spherical dioptric powers regress over time after operation, increasing risks of retinal break and detachment.

5. Massage (invasive), Eye exercises, etc.

6. Acupuncture (invasive)

7. Steam, Hot compress (invasive)

8. Chinese medicine to improve eyesight (invasive)

Items 5-8 of the above methods have been proved to be ineffective clinically, and they lack scientific theoretical basis and explanation.

Second, in addition to the above-mentioned physical or invasive means to correct myopia ametropia, current means of eyesight training to correct myopia ametropia are as follows.

1. The common practice is to look back and forth the visual target and the thumb or finger placed in front. Another common practice is to look at the thumb or finger which is moving back and forth or similar visual targets, such as pens and rulers. Some training centers use a far point-near point training instrument for this operation in which the visual target moves back and forth quickly (the machine generates lot of noise which affect the trainer).

What they have in common is that the visual targets move back and forth at fixed distances. Making use of the distance from the visual target to the eyes when the visual target moves away, hoping that this will completely relax the accommodation of the eyes. However, in fact, the distant visual target is still lies on the central visual line, so that both eyes need to use adductive extraocular muscle to maintain binocular single vision, resulting in the inability to completely relax the accommodation. When the visual target quickly returns near to the eyes, it is the same situation as reading a book at a near distance and increases the accommodation as a result. Therefore, these far point-near point training instrument and methods cannot effectively relax the accommodation. On the contrary, when the eyes look at its central near visual target, the training increases the accommodation instead and can produce accommodation spasm.

2. Eye exercise training in hospitals, optometry shops, eyesight training centers, etc. is that both eyes move in same direction simultaneously. For example, when both eyes look at the right side simultaneously, the right eye is abducent and the left eye is adductive. When both eyes look at the lower left, the right eye is adductive downwards and the left eye is abducent downwards. For adductive eyes, especially those which are adductive downwards, the center of the near-reflex pathway may be activated, resulting in an increase in accommodation, while strengthening the medial rectus and the superior oblique involved in myopia progression. Therefore, such training via the adductive downward eye can increase accommodation and is not conducive to weaken the medial rectus and the superior oblique involved in myopia progression.

3. Some other visual target exercise training in which the visual target moves in different directions in front of the visual field, and involves adductive eye movement when circling around (O, ∞, 8, and other shapes). Such eye movement is an aimless method. When both eyes adduct to look at central visual target, by near reflex, the ciliary muscles of both eyes will contract. When one eye is abducent while the other eye is adductive, the ciliary muscle of adductive eye may contract. In both cases, the visual target which induce adduction in both eyes or one eye can cause an increase in accommodation.

The above three training exercise methods can be indeed ineffective and wrong approaches. They do not decrease but maintain or increase the ciliary muscle contraction. They hence maintain or increase the accommodation and may induce accommodation spasm, thus maintaining or increasing pseudomyopia or true myopia. Therefore, these methods are not desirable as the purpose of slowing down myopia progression or reducing myopia and improving eyesight cannot be achieved.

SUMMARY

Based on the formation and progression of myopia, the present disclosure develops a completely new and unique device and the systematic training method against its development, aiming at recovering and maintaining the best eyesight (visual acuity) by early intervention in subnormal eyesight caused by myopia. At the same time, the occurrence and progress of pseudomyopia and true myopia are avoided, slowed down or prevented.

In order to solve the above technical problems (formation and progression of myopia and subnormal eyesight), the present disclosure provides an eyesight training device and method, including:

a binocular visual-field separation device, including a double-separation plate assembly and an adjustable unit, wherein the double-separation plate assembly includes two separation plates which are movably connected to each other and form an included angle, and the adjustable unit is used for adjustable the included angle between the two separation plates; and a display screen, wherein the double-separation plate assembly separates the display screen into a left visual field and a right visual field.

Preferably, the present disclosure further provides an eyesight training device, wherein the double-separation plate assembly includes a training side and a near-screen side, the training side is arranged on a side of the double-separation plate assembly where the two separation plates are movably connected to each other, the near-screen side is a side which is opposite to the training side, and the near-screen side is close to the display screen to separate the left visual field and the right visual field.

Preferably, the present disclosure further provides an eyesight training device, wherein the adjustable unit is arranged between the two separation plates at the near-screen side, and includes an adjustable knob and an adjustable telescopic bracket, wherein the adjustable telescopic bracket is telescopically connected with the two separation plates, and the included angle between the two separation plates is telescopically adjusted by the adjustable knob.

Preferably, the present disclosure further provides an eyesight training device, wherein the training side further includes a forehead support and a chin support, and a distance between the training side and the display screen is ≥45 cm.

Preferably, the present disclosure further provides an eyesight training device, wherein a color of the double-separation plate assembly is matte carbon black.

The present disclosure further discloses a training method implemented by using any of the eyesight training devices, which is used for eyesight correction of a trainee, wherein:

Step 1, setting a distance between the two separation plates at a near-screen side according to a primary eye position (looking straight ahead) of a trainee;

Step 2, providing at least one movable central training visual target on each side (left and right) of the separated display screen, the central training visual target then moves laterally towards the temporal visual field of trainee's left and right eye respectively. The eyes then track the central training visual target to maintain binocular single vision by moving respectively away from the primary eye position.

Step 3, returning the central training visual targets back to the primary eye position along their original paths when divergent fusional image of binocular single vision obtained by a brain visual center of the trainee changes from fused state to split state Step 4, repeating above steps 1 to 3 for at least two times;

wherein a separation distance between left and right central training visual targets at a beginning of training is 2-30 mm larger than that at the primary eye position.

Preferably, the present disclosure further provides a training method, wherein a length of the central training visual target ranges from 5 mm to 60 mm, and an aspect ratio or a breadth length ratio of the central training visual target ranges from 1 to 5.

Preferably, the present disclosure further provides a training method, wherein a moving speed of the central training visual target ranges from 0.1 degree to 3 degrees per second.

Preferably, the present disclosure further provides a training method, wherein each of the at least one central training visual target includes any one of a 3D visual target, a pattern visual target, a character visual target, a pattern and character combined visual target, a pattern and color combined visual target.

The present disclosure further provides a training method implemented by using any of the eyesight training devices mentioned above for subnormal eyesight correction of a trainee, wherein:

Step 1, setting a distance between the two separation plates at a near-screen side according to a pupil distance of a trainee at a primary eye position;

Step 2, providing at least one movable central training visual target on each of left and right sides of the separated display screen, a distance between central training visual targets which are on the left side and the right side respectively is 2-30 mm larger than the pupil distance of the eyes at the primary position;

Step 3, providing at least a first peripheral training visual target and a second peripheral training visual target at a position of 25 degrees to 60 degrees in a temporal visual field of the trainee on each of the left and right sides of the display screen;

Step 4, moving the first peripheral training visual target towards the second peripheral training visual target closer to a temporal side of the trainee Step 5, returning the first peripheral training visual target to its initial position along its original path when a brain visual center of the trainee percepts that an image of the first peripheral training visual target and an image of the second peripheral training visual target overlap;

Step 6, repeating above steps 1 to 5 for at least two times;

Wherein by adjusting the distance between the central training visual targets which are on the left side and the right side respectively, a pupil distance at a beginning of training is 2-30 mm larger than that when the eyes are at the primary eye position;

Preferably, the present disclosure further provides a training method, wherein the position of 25 to 60 degrees in the temporal side visual field of the trainee is relatively temporal to a visual axis angle of the primary eye position.

Preferably, the present disclosure further provides a training method, wherein a background color of the first peripheral training visual target and the second peripheral training visual target includes gray, and a color of the first peripheral training visual target and the second peripheral training visual target includes matte black.

Preferably, the present disclosure further provides a training method, wherein an area of each of the first peripheral training visual target and the second peripheral training visual target is at least 16 times an area of each of the central training visual targets.

Compared with the prior art, the present disclosure recovers and maintains best eyesight by early intervention on subnormal eyesight caused by myopia by means of completely new systematic training. At the same time, the occurrence and progress of pseudomyopia and true myopia are avoided, slowed down or prevented.

BRIEF DESCRIPTION OF THE DRAWINGS

The accompanying drawings are included to provide a further understanding of the present disclosure and are incorporated in and constitute a part of the present disclosure. The accompanying drawings illustrate embodiments of the present disclosure, and together with the description, serve to explain the principles of the present disclosure.

REFERENCE NUMERALS

Figure 1:
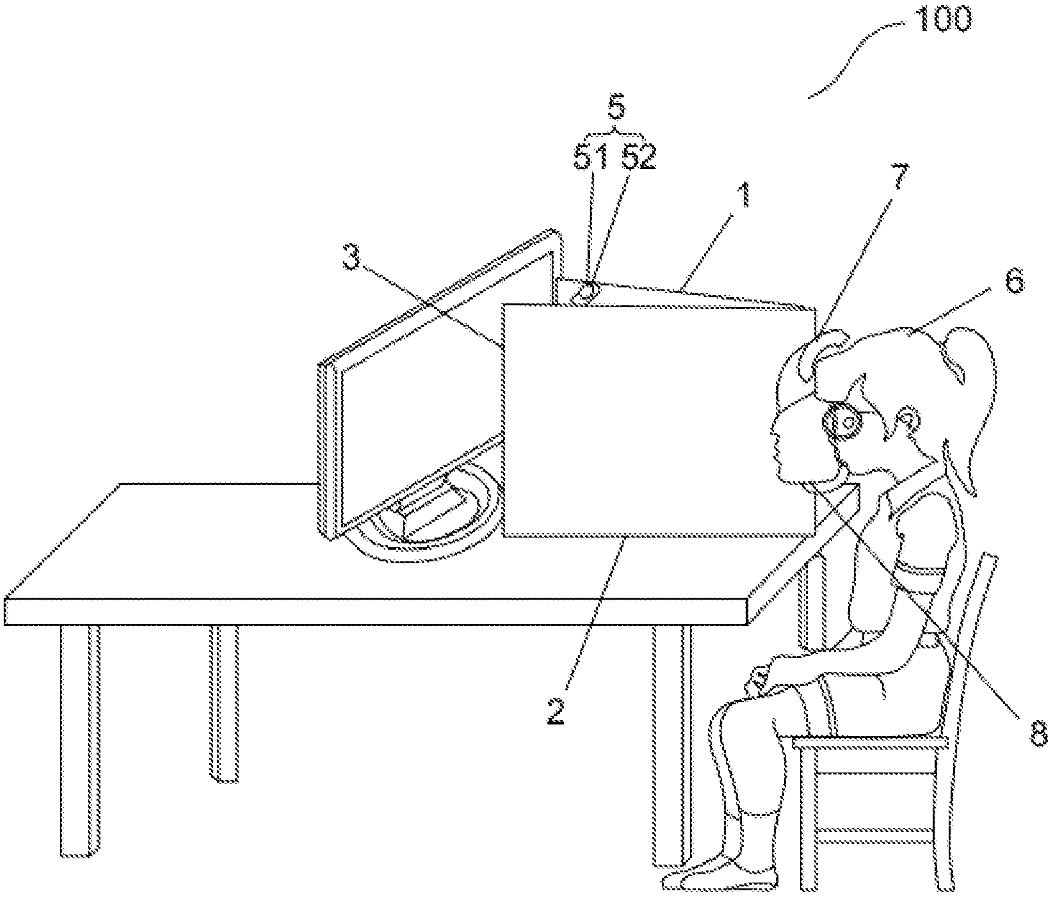
FIG. 1 is a schematic diagram showing an eyesight training device in the user state according to the present disclosure.

1—Double-separation plate assembly
2—Antiskid bottom edge
3—Near-screen side
4—Shelter area
5—unit
51—Adjustable knob
52—Adjustable telescopic bracket
6—Training side
7—Removable forehead support
8—Removable chin support
100—Binocular visual field separation device
200—Display screen
300—Central training visual target
A, B—peripheral training visual targets

DETAILED DESCRIPTION OF THE EMBODIMENTS

In order to explain the technical solution of the embodiment of the present disclosure more clearly, the drawings needed in the description of the embodiment will be briefly introduced hereinafter. Obviously, the accompanying drawings in the following description are only some examples or embodiments of the present disclosure. For those of ordinary skill in the art, the present disclosure can be applied to other similar situations according to these drawings without creative labor. Unless it is obvious from the linguistic context or otherwise stated, the same reference numerals in the drawings represent the same structure or operation.

As shown in the present disclosure and claims, unless exceptions are clearly indicated in the context, the words "a", "an", "a type of" and/or "the" do not refer to the singular but may also refer to the plural. Generally speaking, the terms "including" and "comprising" only imply the inclusion of clearly identified steps and elements, and these steps and elements do not constitute an exclusive list. A method or device may also contain other steps or elements.

Unless otherwise specified, the relative arrangement of parts and steps, numerical expressions and numerical values set forth in these embodiments do not limit the scope of the present disclosure. At the same time, it should be understood that for the convenience of description, the dimensions of various parts shown in the drawings are not drawn according to the actual scale relationship. Techniques, methods and devices known to those of ordinary skill in the art may not be discussed in detail, but in appropriate cases, the techniques, methods and devices should be regarded as part of the authorization specification. In all examples shown and discussed herein, any specific values should be interpreted as illustrative only and not as a limitation. Therefore, other examples of exemplary embodiments may have different values. It should be noted that similar numbers and letters indicate similar items in the following drawings. Therefore, once an item is defined in one drawing, it does not need to be further discussed in subsequent drawings.

In the description of the present disclosure, it should be understood that the orientational or positional relationships indicated by the orientation words such as "front, back, upper, lower, left, right", "lateral, vertical, perpendicular, horizontal" and "top, bottom" are usually based on the orientation or positional relationship shown in the accompanying drawings only for the convenience of describing the present disclosure and simplifying the description. Unless otherwise stated, these orientation words do not indicate or imply that the referred devices or elements must have a specific orientation, be constructed and operated in a specific orientation, and therefore should not be construed as limiting the scope of the present disclosure. The orientation words such as "inside, outside" refer to the inside and outside with respect to the outline of each component itself For the convenience of description, spatially relative terms such as "on", "over", "on the upper surface of" and "above" can be used here to describe the spatial positional relationship between a device or feature and other devices or features as shown in the drawings. It should be understood that spatially relative terms are intended to encompass different orientations in use or operation in addition to the orientation of the device depicted in the drawings. For example, if the devices in the drawings are inverted, devices described as "over other devices or structures" or "on other devices or structures" will be positioned as "under other devices or structures" or "below other devices or structures". Thus, the exemplary term "over" can include both directions of "over" and "below". The device can also be positioned in other different positions (rotated by 90 degrees or in other orientations), and the spatial relative description used here is explained accordingly.

In addition, it should be noted that the words "first" and "second" are used to define parts only for the convenience of distinguishing the corresponding parts. Unless otherwise stated, the above words have no special meaning, so that they cannot be understood as limiting the scope of the present disclosure. In addition, although the terms used in the present disclosure are selected from well-known and common terms, some terms mentioned in the specification of the present disclosure may be selected by the applicant according to his or her judgment, and their detailed meanings are explained in the relevant parts of the description herein. In addition, it is required to understand the present disclosure not only by the actual terms used, but also by the meaning contained in each term.

Flowcharts are used in the present disclosure to explain the operations performed by the system according to the embodiment of the present disclosure. It should be understood that the preceding or following operations are not necessarily performed accurately in order. Instead, the various steps can be processed in reverse order or simultaneously. At the same time, other operations can be added to these procedures, or one or more operations can be removed from these procedures.

In the present disclosure, a method of binocular isolation and separate training is adopted, and a training display interface similar to matts is used during training. The technical solution of adopting such training is described as follows.

1. The common binocular visual field and visual range are divided into the independent monocular visual field and visual range with specially designed separation, and one eye cannot see the visual target and visual field of the fellow eye.

2. The monocular visual field is divided into the shape of "matts", and the selected visual fields beneficial to training are the superotemporal and inferotemporal quadrants. Briefly, according to the present disclosure, the visual field in front of an eye and the range of the visual axis rotation are defined in the shape of "matts", so that the relative position of the visual target in the "matts" visual field will determine the rotation of the visual axis to corresponding relative position in this "matts" range. Generally, when the eyes are at the primary position, the visual axes meet at the "matts" central position. According to the Herring's law, the brain will move the visual axis directions of both eyes to overlap on the visual target. When the visual target is at a distance of 6 meters or more, both eyes do not need to adduct or abduct, because the visual target in space is located directly in front of the visual axes of the eyes. When the visual target is at a shorter distance (less than 6 meters), both eyes need to adduct so that the visual axes overlap on the visual target. At this time, the brain can activate the center of the near-reflex pathway in the midbrain to adduct the eyes simultaneously, so that the visual axes are directly aligned with the visual target. At the same time, the ciliary muscle can contract to change the lens radian and the anterior-posterior diameter to increase accommodation, so as to focus on the visual target closer to the eyes, and the pupil can contract to reduce the interference from peripheral light.

In this case, the central training visual targets in some positions in the range of "matts" can cause subnormal eyesight and myopia.

Now, take a common child who looks down at a book as an example. His eyes move downward and inward so that their visual axes overlap on the visual target being read. The position of the visual target is on the nasal side and the lower side of the range of "matts". For the right eye, the visual target is at a inferonasal quadrant of "matts", and for the right eye, the visual target is at a left lower quadrant of "matts", for the left eye, the visual target is at a right lower quadrant of "matts". Both eyes therefore need to adduct and infraduct so that the visual axes of both eyes are rotated inferonasally to allow for observing the visual target and reading purposes. At this time, the medial rectus, inferior rectus and superior oblique contract while the lateral rectus, superior rectus and inferior oblique relax. This activation of near-reflex pathway will induce the ciliary muscles of both eyes of the child, who is looking down at a book, to contract and increase the accommodation. On returning to looking at a distant target again, activation of the near-reflex pathway is no longer needed, and the ciliary muscles and accommodation should resume the original relaxed state. However, after long-term and repeated observation and reading at a close distance, the ciliary muscles and accommodation often do not completely resume the original relaxed state, leading to the occurrence of pseudomyopia and true myopia.

It can be seen that when the visual target is on the nasal side of the range of "matts", the visual axes of both eyes need to be turned to the nasal side to achieve binocular single version (Herring's Law). Such adduction involves synchronized contraction of the medial rectus and relaxation of the lateral rectus to achieve simultaneous adduction of the visual axes of both eyes. To achieve such adduction, the brain activates the center of the near-reflex pathway to contract the ciliary muscle and increase accommodation simultaneously. Therefore, the visual target located on the nasal side of "matts" is not a good positioning, especially for a person already having pseudomyopia or true myopia, because such positioning will induce activation of the near-reflex pathway, resulting in adduction, contraction of ciliary muscle and aggravating accommodation further, which is exactly what one wants to avoid.

Therefore, the visual axes should avoid entering the nasal, especially the inferonasal quadrant of the "matts". On the contrary, the temporal quadrant of the "matts" is the best for visual target positioning, because the medial rectus, superior oblique and inferior oblique are no longer needed on moving the visual axes to this area. Therefore, the temporal quadrants of "matts" are selected for beneficial visual target positioning for training against pseudomyopia and myopia formation.

Therefore, the range description of "matts" is a suitable training display interface.

According to the above description, which is beneficial to eyesight training, the training visual target appears at special positions of the "matts", corresponding to the upper and lower quadrants of the temporal side of the "matts", achieving favorable training effect.

3. On this basis, in the present disclosure, the training visual target moves in specific direction to match and specify the moving direction and angle of the specific extraocular muscle being trained with the application of the Herring's law and Sherrington's law.

Training guides both eyes to abduct to move and look at the temporal sides by means of the specified moving direction of the visual targets, and at the same time, inhibits the need for adductive eye movement. Therefore, the brain needs to inhibit the activation of the midbrain center of the near-reflex pathway, so as to relax the contraction and/or spasm status of the ciliary muscle in pseudomyopia and true myopia as well as reversing the increased lens accommodation state back to the normal relaxed state.

4. Target specific induction and training of the divergent fusional ability (with application of the Herring's Law and Sherrington's Law).

If training is relying only on the visual target of a single eye in the quadrants of the temporal side of the visual field of "matts" of this single eye, the relevant extraocular muscle, lateral rectus, superior rectus and inferior rectus of this single eye are properly trained. However, according to the Herring's law, the medial rectus, superior oblique and inferior oblique of the fellow eye will be trained and strengthened at the same time. Therefore, relying on the visual target of a single eye for training cannot maximize nor maintain inhibition of the center of the near-reflex pathway, nor can it strengthen abducent extraocular muscle and weaken adductive extraocular muscle most efficiently at the same time.

Therefore, on training, only one of two similar visual targets is presented to one eye while the other one is presented to the fellow eye at the same time. The distance between the two visual targets is no less than the pupil distance of the eyes at the primary position. Once receiving the respective signals of the visual target viewed by each eye individually, the visual processing center of the brain will fuse them together to obtain the binocular single vision and will increase the inhibition of the activation of the center of the near-reflex pathway to relax the ciliary muscle from the contraction and/or spasm state. Thus, the lens surface radian and the anterior-posterior diameter of both eyes can relax and return to normal, as well as the abducent extraocular muscle and weaken the adductive extraocular muscle of each eye are strengthened.

5. Formation and maintenance of specific 3D stereo image of visual targets (application of Herring's law and Sherrington's law)

The same kind of visual targets presented to each single eye may be specially designed to have complementary differences. In this case, once receiving the respective signals from visual targets viewed by each single eye, the brain visual center will process and fuse the signals together to obtain binocular single vision and form the 3D stereo image of the visual targets. The 3D stereo image of visual targets can greatly enhance the inhibition of the center of the near-reflex pathway in a feedback manner, activate the abducent extraocular muscle movement and inhibit adductive extraocular muscle movement, and at the same time, inhibit ciliary muscle contraction and/or spasm, and relax the accommodation.

There are three advanced levels of binocular single vision, including a first level in which the brain visual center receives signals of the same visual target from the macula of each eye at the same time, a second level in which the brain visual center fuses the signals of the same visual target seen by both eyes and maintains the fusion, and a third level in which the brain visual center fuses the signals of the same visual target seen by both eyes for forming and maintaining a 3D stereoscopic fusion image of the visual target. The three training methods involved in the above 3 to 5 can inclusively train trainees at different levels of the binocular single vision.

The three training methods all involve the brain visual center to make use of the mechanism of divergent fusional ability to achieve and maintain the goal of binocular single vision. Because these training methods are training and increasing the ability (easier to carry out divergent fusion) and range (for example, the divergent fusional range is improved from 0 to 40 mm to 0 to 50 mm on viewing at a distance of 45 cm) of the divergent fusional ability at the same time, the purpose of training is achieved and strengthened.

In addition, in the aspect of training visual targets, the present disclosure also specifically gives the following content.

1. Various types of conversion of the training visual targets (images, characters, numbers, etc.).

2. Special changing ways and forms of the training visual targets (size, proportion, color change, virtual and real contour lines, etc.).

3. Display time of the training visual targets (duration)

4. Static state and dynamic state of the training visual targets (combination of dynamic state and static state, mosaic fusion).

Because of the natural need and affinity for binocular single vision, the brain will fuse the similar visual targets viewed by each single eye statically (when the visual targets are motionless) or dynamically (when the visual targets are moving, the pursuit tracking mechanism of the brain is involved), the visual targets can therefore be presented statically, dynamically or in combination for visual stimulation purpose.

Part of the purpose of the above settings for the training visual targets 1 to 4 is to avoid visual fatigue due to "Troxler fading effect", maintain concentration during training, and prolong the stimulation interval, thus reinforcing the inhibition of the center of the near-reflex pathway, strengthening activation of the abducent extraocular muscle and inhibition of the adductive extraocular muscle, and relaxing the accommodation by inhibiting the ciliary muscle contraction and/or spasm.

On this basis, a series of specifically designed training visual targets related in meaning are presented sequentially or cooperate with audio, so that story elements link up the visual targets, and such association among elements constitutes logical plots or scenes.

The content and presentation of the training visual targets can attract continuous attention, concentration, interaction, enjoyment and education. It can also achieve inhibiting the center of the near-reflex pathway, activating and strengthening the abducent extraocular muscle while inhibiting and weakening the adductive extraocular muscle, as well as inhibiting ciliary muscle contraction and/or spasm and relaxing accommodation with very high efficiency and very low time cost.

Figure 2:
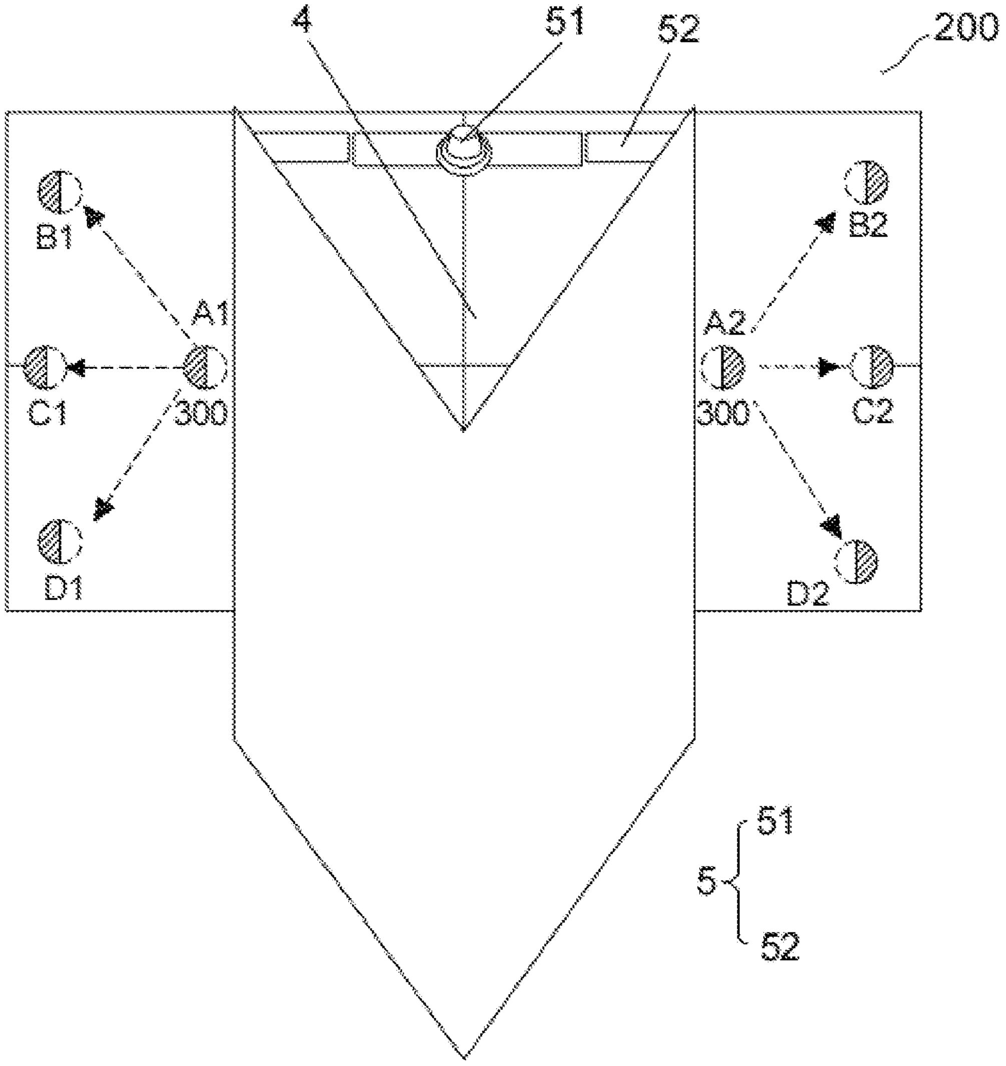
FIG. 2 is a schematic diagram of an eyesight training device (including a double-separation plate assembly and a display screen) according to the present disclosure.

With reference to FIGS. 1 and 2, the composition of the training device of the present disclosure will be introduced hereinafter.

The training device includes a binocular visual-field separation device 100 and a display screen 200. The binocular visual-field separation device 100 is configured to separate binocular visual field into independent vision areas for right and left eye respectively, and the display screen 200 is configured to provide movable training visual targets for each eye in its respective independent vision area.

The binocular visual-field separation device 100 includes a double-separation plate assembly 1, which consists of two separation plates with one end at a kissing position while the other end opens at a certain angle. The size of each separation plate is as follows: the bottom length is about 42 cm (between 40 cm and 45 cm, not limited to this length range) and the height range is around 15 cm to 45 cm (not limited to this height range, depending on the height of the display screen 200). The color of the double-separation plate assembly 1 is matte carbon black. The kissing ends constitute the training side 6, and the open ends thereof constitute the near-screen side 3 which faces the display screen 200. Moreover, the double-separation plate assembly 1 is foldable for adjustable angle between the two separation plates.

A preferred embodiment shown in FIG. 2 illustrates the structure of an adjustable unit 5. The adjustable unit 5 is arranged between two separation plates at the near-screen side 3 and includes an adjustable knob 51 and an adjustable telescopic bracket 52, wherein the adjustable telescopic bracket 52 is telescopically connected to the two separation plates, and with the adjustable knob 51 arranged thereon, thereby adjusting the included angle between the two separation plates.

In order to obtain a more comfortable training effect, the kissing end of the double-separation plate assembly 1 of the binocular visual-field separation device 100 is the training side 6, which is close to the head and face of the trainee and designed as a curvy surface conforming approximately to the contour of common human face.

The opening ends of the double-separation plate assembly 1 forms the near-screen side 3, which is close to the display screen 200, and the opening angle and separation between the separation plates of the near-screen side 3 is adjusted by adjustable knob 51 to fit the pupil distance when trainee eyes are at the primary eye position, so that the separation distance is no less than the pupil distance during training. In addition, an antiskid bottom edge 2 is provided to stably place the double-separation plate assembly 1 on a flat desktop. Furthermore, a detachable forehead support 7 and chin support 8 are provided for comfort during training.

The double-separation plate assembly 1 is placed between the display screen 200 and the trainee eyes to avoid the two unfavorable factors described above in training. By means of the use of the double-separation plate assembly, when one eye looks at the visual target individually, the eye is not attracted nor interfered by the visual target in the fellow eye's visual field. By means of the design of the double-separation plate assembly, the opening angle and separation distance between the separation plates of the near-screen side 3 can be adjusted to fit the variable pupil distances among different trainees, thus avoiding the appearance of the nasal visual field and ensure that the visual targets only appear in the temporal visual field of each eye for favorable training purpose.

This will be described in further detail hereinafter.

FIG. 2 further illustrates a schematic diagram of the combination of the separation device 100 and the display screen 200 according to the present disclosure. The display screen 200 presents the combination of two "matts" which are on right and left sides, respectively. The near-screen side 3 of the separation device 100 is close to the display screen 200. The separation device 100 divides the whole display screen 200 into right side and left side with the shielding area 4 in the middle. Movement of central training visual targets 300 on screen 200 is programmed, and the trainee on the training side 6 (FIG. 1) keeps tracking the movement of the central training visual targets 300 to achieve the training effect.

When the central training visual targets 300 move on the display screen 200, the observation of the trainee is as follows.

1. The central training visual targets 300 are presented at special positions.

(1) The visual field quadrants formed by X axis and Y axis: the role and application of positions of the central training visual targets in the quadrants.

For the application of the central training visual targets 300 at selected coordinate positions, when both eyes are at the primary eye position and looking straight ahead, the distance between both eyes is the pupil distance and both eyes are not adductive or abducent, and at this time, the coordinates of the central training visual targets are just at the center points of the quadrants of the visual field shaped like "matts". The Y axis passing through the center point separates the visual fields into nasal and temporal quadrants. The visual targets in nasal visual field quadrants are prone to activate the near-reflex pathway. The X axis passing through the center point separates the visual fields into upper and lower quadrants, and the lower nasal (inferonasal) quadrant visual field is most likely to activate the near-reflex pathway. As mentioned in the advantageous position of "matts" above, "the visual field quadrants most beneficial to eyesight training is the temporal upper (superotemporal) and lower (inferotemporal) quadrants" (the directions of four diagonal arrows in the display screen 200 in FIG. 2), for the trainee, the first and fourth quadrants of the right eye and the second and third quadrants of the left eye are the visual field quadrants most beneficial to eyesight training, so the central training visual targets will only appear in these quadrants while other quadrants are not used. This way, inhibition of the center of the near-reflex pathway is reinforced while activation and strengthening of the lateral rectus, the superior rectus and the inferior rectus are potentiated.

(2) The starting positions of the central training visual targets is adjusted to fit the eye positions of the trainee.

Because some people have latent strabismus, the left and right eyes may have horizontal (left and right) or vertical (up and down) deviation. Relatively vertical deviation has far more adverse impacts, and even a small vertical deviation may cause significant visual interference. Therefore, before the training begins, there is an adjustment function to correct the positions of the visual targets to match the visual axes of both eyes where the deviation is neutralized, so that the left and right eyes are relatively in the neutral state and positions before the training begins. When the pupils of both eyes of the trainee are at the most accurate training starting point with respect to the X axis and the Y axis, the deviation caused by the head deviation and latent strabismus of the trainer has been neutralized, thus avoiding the unwanted interference caused by the deviation between the two eyes in the horizontal and vertical axes.

(3) The distance between the central training visual targets and the trainee.

The distance between the central training visual targets and the trainee is adjusted according to the types of display screens, and it is maintained at a distance no less than 45 cm for the display screens of general computers and tablet computers. When using a TV or large projection screen, the usual viewing distance shall prevail.

2. The specific moving directions and tracks of the central training visual targets (1) The angles of the moving directions and tracks of the central training visual targets with respect to the primary eye position (in cooperation with the main moving direction and angle of the specific extraocular muscle targeted in the training, application of the Herring's law and Sherrington's law).

The union between the extraocular muscle and the eye have a relatively fixed positional relationship, and the union positions of the medial rectus, lateral rectus, superior rectus and inferior rectus with the eye are all anterior to the equator of the eye. The union positions of the superior oblique and inferior oblique with the eye is behind the equator of the eye. There is also relatively fixed angles between the extraocular muscles and the visual axis. At the primary eye position, the angle of the superior oblique and inferior oblique with respect to the visual axis is 51 degrees, while the angle of the superior rectus and inferior rectus with respect to the visual axis is 23 degrees. The medial rectus is nearly in parallel to the inner side of the orbit, so that the angle of the medial rectus with respect to the visual axis is close to 0 degree. The lateral rectus is nearly in parallel to the outer side of the orbit, so that the angle of the lateral rectus with respect to the visual axis is close to 45 degrees.

Because the union positions of the extraocular muscles are in front of or behind the equator of the eye and at different angles with respect to the eye axis at the primary eye position, each extraocular muscle will have its primary role, secondary role and tertiary role in the rotation of the eye axis when contracting. When the eye axis is rotated away from the primary eye position, at this time, the secondary role or the tertiary role of an extraocular muscle can surpass or be different from its primary role.

According to Sherrington's law, when an excitatory muscle is activated, the nervous system will simultaneously inhibit the corresponding antagonistic muscle. Taking advantage of the law, the training we designed is to intentionally move the eye axis to the favorable visual field quadrants of the "matts" in a targeted manner to specifically train and strengthen the extraocular muscles weakened in pseudomyopia and true myopia, and at the same time weaken the specific extraocular muscles strengthened in pseudomyopia and true myopia.

When repetitively looking at visual targets in the visual field nasal quadrants for a long time, in order to obtain and maintain binocular single vision, according to Herring's law, both eyes medial recti are needed to adduct for a long time (primary role of medial rectus is adduction) to maintain the eye axis fixation to the visual field nasal quadrants which tends to induce the occurrence and progress of myopia. In addition, when both eyes look at the visual target in the inferonasal visual field quadrant during reading, the medial rectus and the superior oblique are activated to rotate the visual axis to the inferonasal quadrant which are more likely to induce and reinforce the occurrence and progress of myopia (when the medial rectus rotates the eye axis nasally, the secondary role of the superior oblique surpasses its own primary role and rotates the eye axis downward to the inferonasal quadrant). When both eyes look at the visual target in the superonasal visual field quadrant during reading, the medial rectus and the inferior oblique are activated to rotate the visual axis to the superonasal quadrants which tend to induce the occurrence and progress of myopia (when the medial rectus rotates the eye axis nasally, the secondary role of the inferior oblique surpasses its own primary role and rotates the eye axis upward to the superonasal quadrant). Simultaneously, according to Sherrington's law, the lateral rectus, superior rectus and inferior rectus are inhibited and weakened for the same duration.

In order to avoid the nasal visual field quadrant which tends to induce the occurrence and progress of myopia, especially the inferonasal visual field quadrant, the visual target during training aims to rotate the trainee eye axis to the favorable temporal visual field, the superotemporal and inferotemporal quadrants (that is, the first and fourth quadrants of the right eye and the second and third quadrants of the left eye visual field). When both eyes look at the visual targets in the temporal visual field quadrants at the same time during training, in order to achieve and maintain binocular single vision, according to Herring's law, the brain visual center will lead to activation of the corresponding lateral rectus nucleus in the brain stem to abduct both eyes (the primary role of the lateral rectus is abduction), so as to maintain the rotated eye axis at the temporal side. If the visual target moves to the superotemporal quadrant of the visual field, the lateral rectus and superior rectus are activated (when the lateral rectus abducts the eye axis, the primary role of the superior rectus is strengthened, and the eye axis is rotated upward to the superotemporal quadrant). If the visual target moves to the visual field inferotemporal quadrant, the lateral rectus and the inferior rectus are activated (when the lateral rectus abducts the eye axis, the primary role of the inferior rectus is strengthened, and the eye axis is rotated downward to the inferotemporal quadrant). Simultaneously, according to Sherrington's law, the lateral rectus, the superior rectus and the inferior rectus are activated and muscle tone strengthened, while the medial rectus, the superior oblique and the inferior oblique are inhibited and muscle tone weakened.

Specifically, the movement program of the central training visual targets 300 of the present disclosure is as follows.

With the trainee eyes at the primary eye position, the visual axes of eyes match the respective "matts" central positions which corresponds to position A1 and position A2 in FIG. 2, respectively. As training begins, the moving directions and tracks of the central training visual targets 300 are as follows.

First, moving outward to position C1 and position C2 along the horizontal line, specifically targeting and training the lateral rectus to abduct and rotate the eye axes from 0 degree (towards temporal 90 degrees).

Second, moving outward and upward to position B1 and position B2 (in the direction of 23 degrees to the superotemporal quadrant), the superior rectus and lateral rectus are trained at the same time on rotating and keeping the eye axes locked at B1 and B2.

Third, moving outward and downward to position D1 and position D2 (in the direction of 23 degrees to the inferotemporal quadrant), the inferior rectus and lateral rectus are trained at the same time on rotating and keeping the eye axes locked at D1 and D2.

Not limited to the above moving tracks. The sequential order of the moving directions of the central training visual targets 300 can be arbitrarily modified, for example, first outward, then upward (or downward), then outward, etc.

The primary eye position means that each eye is looking straight ahead with its visual axis parallel to the head's sagittal plane, and the eye position at this time is the primary eye position. The distance between the two central training visual targets 300 is slightly larger than the pupil distance of both eyes of the trainee at the primary eye position, usually at least larger than the pupil distance by 2 mm. The starting positions of the two central training visual targets correspond to A1 and A2 in FIG. 2, respectively. For the specific extraocular muscles to be trained, the central training visual targets 300 move along the angular directions of this specific extraocular muscle being trained. The end point is when the maximum value of divergent fusional ability is reached, that is, when both eyes observe that the fusion images of the central training visual targets 300 on the display screen 200 are obtained by the trainee's brain visual center during temporal movement of the training visual targets.

The above training is based on the application of Herring's Law and Sherrington's Law. Its purpose is, by programmed presentation of static or dynamic visual target in the temporal visual field, and in fulfilling the requirements of Herring's Law for binocular single vision, the divergent fusional ability is activated and strengthened in a targeted manner, thus achieving and maintaining the training purpose.

At the same time, the programmed specific abducent exercise training of both eyes inhibits the activation of the center of the near-reflex pathway and activates specific eye abducent movements to activate and strengthen the extraocular abductor muscles, and with Sherrington's law, inhibits and weakens the extraocular adductive muscles.

As it is easier to activate the center the near-reflex pathway of people with pseudomyopia and true myopia, the more training as above, the easier it is to inhibit the center of the near-reflex pathway and reduce the easiness to activate it. The central training visual targets 300 are statically located or dynamically presented along the main moving direction and range of the specific targeted extraocular muscles, thus most effectively activating and strengthening most abductor muscles while the extraocular adductive muscles are inhibited and weakened at the same time.

Figure 3A:
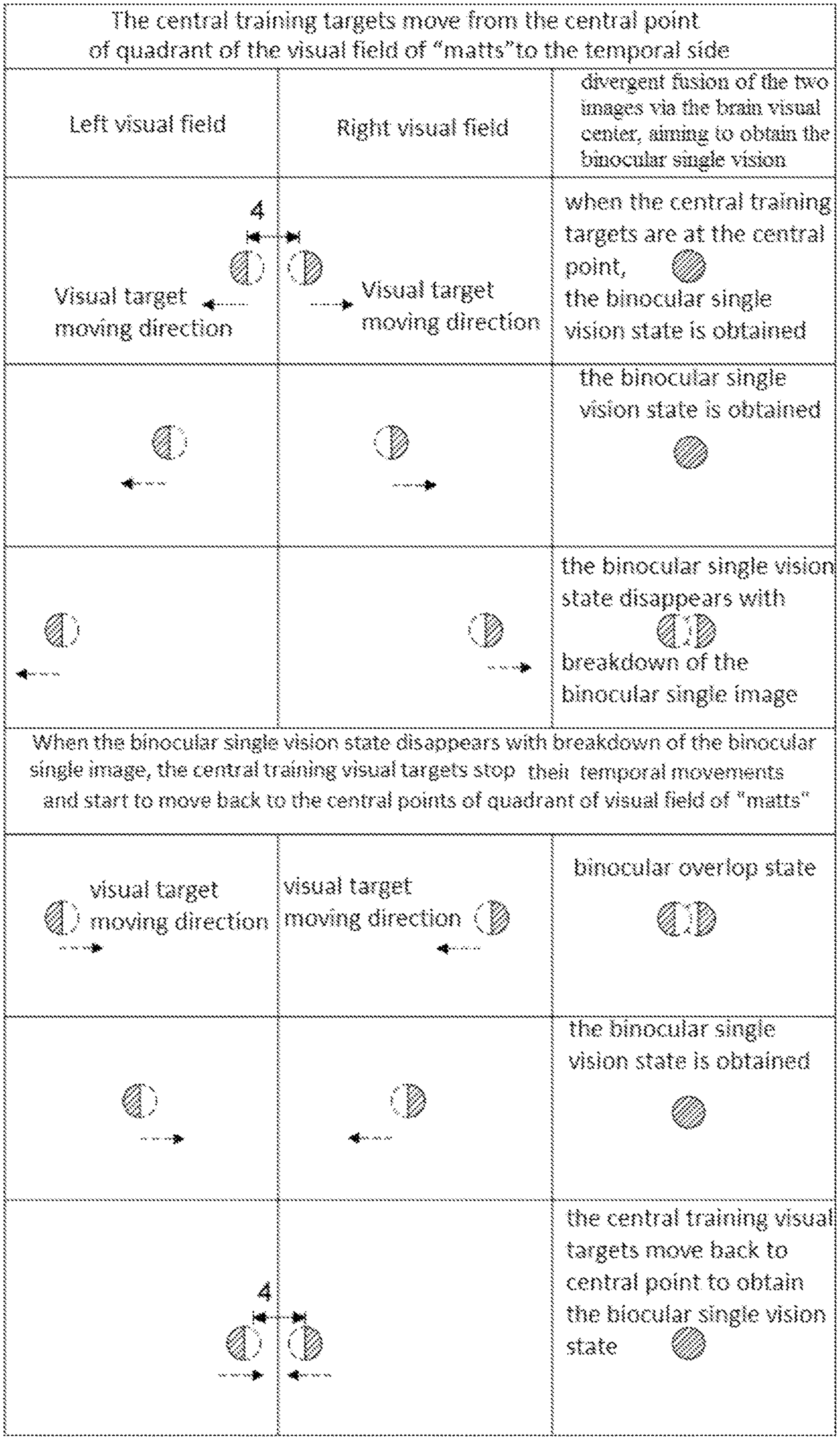
FIGS. 3A to 3C are schematic diagrams of three situations in which the training visual targets move in different directions on the display screen for training.

FIG. 3A is the schematic diagram showing the partitioned left and right temporal visual fields of the trainee, and composite images obtained after divergent fusion by the brain visual center when the central training visual targets 300 in FIG. 2 move horizontally from A1 to C1 and A2 to C2 respectively.

The left and middle columns show the images of the left and right temporal visual fields in the process that the central training visual targets 300 move from A1 and A2 to C1 and C2 and back to A1 and A2, respectively. The right column shows the images of the binocular single vision state formed by divergent fusion of the two images by the brain visual center.

When the binocular single vision state disappears with breakdown of the binocular single image, the central training visual targets 300 stop their temporal movements and start to move back to the starting position.

Figure 3B:
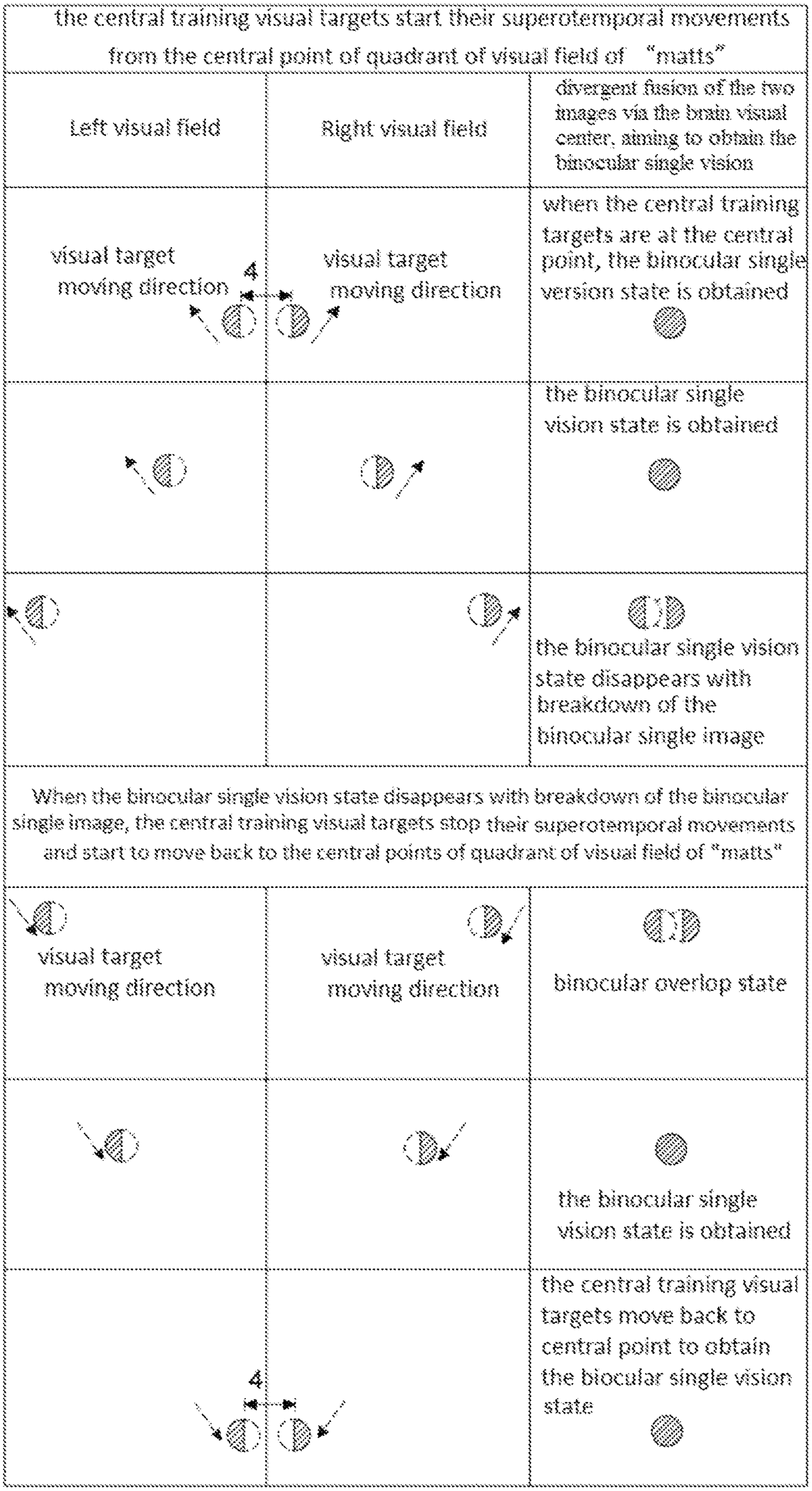

FIG. 3B is the schematic diagram of the left and right temporal visual fields of the trainee showing the images after divergent fusion by the brain visual center when the central training visual targets 300 in FIG. 2 move obliquely upward from A1 to B1 and A2 to B2, respectively.

The left and middle columns show the images of the left and right visual fields in the process that the central training visual targets 300 move from A1 and A2 to B1 and B2 and back to A1 and A2, respectively. The right column shows the images of the binocular single vision state formed by divergent fusion of the two images via the brain visual center.

When the binocular single vision state disappears with breakdown of the binocular single image, the central training visual targets 300 stop their superotemporal movements and start to move back to the starting position.

Figure 3C:
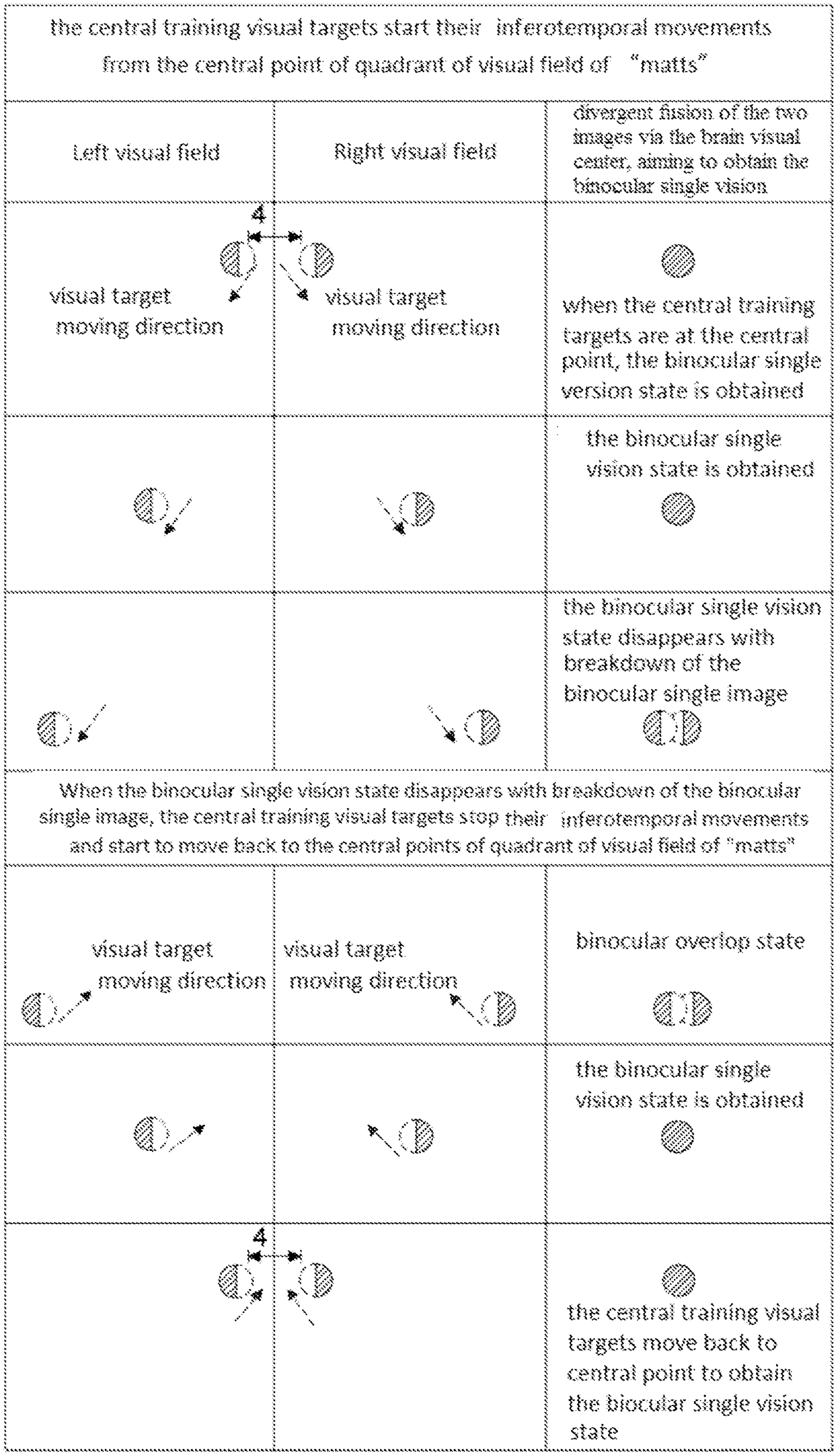

FIG. 3C is the schematic diagram of the left and right temporal visual fields of the trainee showing the images after divergent fusion by the brain visual center when the central training visual targets 300 in FIG. 2 move obliquely downward from A1 to D1 and A2 to D2, respectively.

The left and middle columns show the images of the left and right temporal visual fields in the process that the central training visual targets 300 move from A1 and A2 to D1 and D2 and back to A1 and A2, respectively. The right column shows the images of the binocular single vision state formed by divergent fusion of the two images via the brain visual center.

When the binocular single vision state disappears with breakdown of the binocular single image, the central training visual targets 300 stop their inferotemporal movements and start to move back to the starting position.

It can be seen from the right column of the FIGS. 3A-3C described above that when the central training visual targets moving in the left and right temporal visual fields are seen by the trainee, both eyes move to follow visual targets to keep merging them via divergent fusional ability to form a complete and clear binocular single vision. As the visual targets continue temporal movement, the divergent fusional ability limit will be breached and the binocular single vision starts to break and the fused image state changes to split image state, and the visual targets stop moving at this time.

It should be noted that, with the brain visual center processing function, compare to the 2D planar visual image obtained when only one eye is used for observation, the visually sharper and more vivid 3D stereoscopic visual image obtained when both eyes are used together for observation is significant improvement visually. Therefore, the central training visual targets 300 and programmed positioning and tracks of movement of the present disclosure result in good 3D stereoscopic visual images to boost training efficacy.

As the processing in the brain visual center is programmed to process and form and keep the best visual images as possible, for example the obtained 3D stereoscopic visual images, the brain visual center interacts with the specific extraocular muscle nuclei in the brain stem in a feedback manner to keep or move the visual axis of the eye, so as to maintain the continuation of the 3D stereoscopic visual image of interest. At this time, both eyes can be static, adductive (which means that both eyes move inwardly in opposite directions at the same time, such adductive movement is avoided during training of present disclosure), abducent (which means that both eyes move outwardly in opposite directions at the same time, such abducent movement is encouraged during training of present disclosure), upward, downward, left, right or oblique movements in the same direction at the same time (these left, right or oblique movements in the same direction at the same time is avoided during training of present disclosure). When the eye axes rotate to continue fixation on the visual targets of interest, the need of visual maintenance of the formed 3D stereoscopic visual image will guide both eye axes to rotate along the programmed track in a feedback manner until both eye axes rotate beyond the limit of the divergent fusional ability of the brain visual center, at this time, the fused 3D stereoscopic visual image will be decomposed into two separate 2D planar visual images, thus causing diplopia. By taking advantage of the visual level superiority of 3D stereoscopic visual images over 2D planar visual images, the training of present disclosure offers continuous strong and effective inputs to the brain visual center in strengthening the divergent fusional ability in turn, repeatedly inhibit the center of the near-reflex pathway, thus inhibiting ciliary muscle contraction and/or spasm and relaxing accommodation with very high efficiency and very low time cost. At the same time the abduction of both eyes is activated to strengthen the abducent extraocular muscles weakened by myopia, and weaken the adductive extraocular muscles strengthened by adduction in myopia.

For example, the left and right eyes have respective complete or incomplete visual target patterns.

It can be complete visual target patterns for the left and right eyes respectively. The purpose is through the left and right eyes and the brain visual center to merge the two complete visual target patterns together to form a complete (3D) visual image and background. It can also be incomplete visual target patterns for the left and right eyes respectively, for example, the incomplete pattern of a lion is presented. The purpose is to configure the left and right eyes to merge the two incomplete lion patterns together to form a specific complete (3D) visual image of lion and background.

In order to ensure the above training effect, the moving speed of the central training visual targets 300 used by the present disclosure ranges from 0.1 degree to 3 degrees per second.

In addition to the above circular visual targets with complementary contrast, the following visual target categories can also be used.

Pattern visual targets, including animals, plants, landmarks, landscapes, rivers, cars, boats, airplanes, daily necessities, restaurants, hotel lobbies and concert halls etc. These visual targets can be photos, painting images or cartoon images.

Text visual targets, including Chinese characters, Tang and Song Poetry, Three-Character Classic etc. Languages include: English, French, German, Japanese, Korean, Latin etc.

Visual targets combined with pattern and text, including, for example, lion patterns and language text (e.g., "lion") appearing at the same time or in sequence.

Various combinations in the scene are switched, such as: patterns and patterns (a lion then a tiger), patterns and texts (lion patterns and language text, e.g., "lion," appearing at the same time or in sequence), texts and texts (different languages synonyms etc. at the same time or in sequence).

When viewed at the distance of 45 cm with a tablet computer, the size of the visual target is about 15 mm×15 mm (based on the relative training distance, the size can be changed appropriately to meet the vision level and training needed).

It should be noted that the training visual target 300 applied in the present disclosure satisfies the length: width≤5:1 or width:length≤5:1 of the visual target on the 2D plane.

To avoid the symptoms of discomfort such as dizziness and headache caused by difficulty in merging visual images at the brain visual center when visual targets with more than 10% size disparity seen by the left and right eyes respectively, same size visual targets are therefore presented. When binocular single vision is obtained, unilateral visual target can become larger or smaller to introduce size disparity less than 10% to further stimulate training of the divergent fusional ability under the condition that the relative distance and angle between the left and right eyes axes remain unchanged.

With respect to the application of the training visual target color and its variation, and the background color, for example:

a. The training visual target can be a tiger without color filling but plain outline only, and then automatically and gradually filling with more colors to obtain a complete colored tiger.

b. The colors on both sides can be the same or different, so as to achieve superposition or mixing effect, such as alternating colors like red, green, blue, yellow and so on. In addition, the brain visual center will superpose two similar visual images with different colors from each of the pair of eyes to obtain a mixed visual image with another different color than before (a blue visual image is superposed on a green visual image will form a light blue visual image), thus obtaining a complete (3D) visual image with specific colors and background.

c. The color can be changed in shades, for example, from light green to jade green and then to dark green, and vice versa.

d. The background color is gray to reduce unwanted bright light stimulation, so as not to interfere with the concentration of the trainee on the central and peripheral training visual targets.

With respect to the change of the brightness of the training visual target, it can be changed rhythmically, from relatively darker to brighter, and vice versa, back and forth, thus avoiding too much brightness which induce unwanted pupillary reaction and surge in accommodation.

In addition, the training visual targets can be presented in static or dynamic modes (static, dynamic, static-dynamic combination, mosaic images combination, short video etc.).

Training is carried out by selecting program for fixed or random presentation of training visual targets in static and dynamic modes.

During static training, the visual targets seen by each of the pair of eyes do not move.

During dynamic training, the visual targets move step-by-step or jump. For example, the training visual target of one eye is a bird, and the training visual target of the fellow eye is a birdcage (it is just big enough to hold the bird, and the bird has to be kept in the birdcage visually during training).

a. The visual target of each eye is moving.

b. The visual target of one eye is fixed, and the visual target of the fellow eye is moving.

c. The visual targets of each eye moves alternately.

Mixed static and dynamic training is as follows.

Example 1: In the production of mosaic images, the training visual target is very incomplete at the beginning, and it is necessary to splice together the image components bit by bit, and finally obtain a complete mosaic image.

Example 2: shadows are added around the outline of the training visual target, or additional targets are added (for example, a bird is added on the back of the cow, and a tree is added beside the cow).

Example 3: Cartoon short stories are used as to present the visual targets for training. In addition, in terms of the display time and moving speed (duration) of the training visual target, they can be controlled to be faster or slower for more efficient visual impact.

Considering that the average blink time is 0.3 to 0.4 seconds, the display time of the visual target is no less than 0.5 seconds. In addition, considering the "Troxler fading effect", after focusing on a fixed target for 20 seconds or more, the visual stimulus will fade and disappear. Therefore, the display time of a fixed training visual target should not exceed 10 seconds during training.

Starting from a slow moving speed, the brain uses its pursuit mechanism for tracking slowly moving visual targets, to drive the being trained extraocular muscles (which are inhibited in the near-reflex pathway) to moves in their primary moving directions. The minimum distance of the monocular visual target with respect to the midline is determined based on the pupil distance between both eyes at the primary eye position. This is taken as the lowest distance, that is, the starting point for training the divergent fusional ability, along the angle direction of the eye, union and the extraocular muscles being trained, until reaching the highest limit of divergent fusional ability, that is, the end point. On repeating training, the tracking speed is slowly increased until reaching the maximum.

After being accustomed to the faster pursuit tracking movement, the visual target movement is changed to the form of jumping. This time, the brain uses its saccadic mechanism for tracking rapidly moving visual targets, to drive the being trained extraocular muscles (which are inhibited in the near-reflex pathway) to move in their primary moving directions. The minimum distance of the monocular visual target with respect to the midline is determined based on the pupil distance between both eyes at the primary eye position. This is taken as the lowest distance, that is, the starting point for training the divergent fusional ability, along the angle direction of the eye, union and the extraocular muscles being trained, until reaching the highest limit of divergent fusional ability, that is, the end point. On repeating training, the tracking speed is slowly increased until reaching the maximum.

Making use of the relationship in meaning of a series of training visual targets that appear one after another, such as the characters of Tang poetry images are composed from the visual targets seen by the left and right eyes respectively, and by means of the repeated movement and combination of each visual target to form complete, coherent and meaningful characters. The visual targets of various musical instruments can also be combined in different combinations to form a complete image. Other training targets include mathematical formulae, introduction of astronomical or historical knowledge and so on.

In addition, the training visual target of the present disclosure can be combined with audio. The audio content and the training visual target are organically interacting with each other, including explanation for language, music or both, or story-telling, or simply the provision of various kinds of background music.

For example, music score is combined with music sound. Sound can be the music itself or the background introduction of music, including related stories of a composer, composition background etc. The purpose is, with background commentary music to resonate with the visual targets, and achieve educational effect, so as to maintain the concentration during training.

The application of the above types of training aims to stimulate the visual processing center of the brain continuously and effectively through efficient visual targets presentation, so as to avoid the "Troxler fading effect" caused by immobile visual target, thus avoiding visual fatigue while prolonging the stimulation time, improving the visual attraction, maintaining the concentration of training, and greatly enhancing the stimulation effect per unit time. This way, the training efficiently and effectively inhibit the center of the near-reflex pathway to relax the ciliary muscle from contraction and or spasm, and return unwanted extra lens accommodation back to the neutral state before it was increased by the myopia drive. At the same time, the abducent and oblique extraocular muscles are strengthened while the adductive and vertical recti extraocular muscles are weakened. Thus achieving highly efficient and effective training purpose with as little time consumption as possible and high efficiency.

According to the present disclosure, training visual targets with related elements or scenes among themselves can become associated to form a logical plot or stories. Through these interactive training media methods with vivid, interesting and knowledge-transfer visual targets (with related audio or background music), benefits to trainee are educational and knowledge acquisition and avoiding the inattention and inefficient training results caused by the boring training process.

Using attractive visual targets to form visual images with characters: 3D stereoscopic, its appearance-disappearance, color change, size enlargement-reduction, subtle addition or reduction of appearance, alternation between thinness and thickness, virtuality and reality of contour lines, mosaic patterns, moving, jumping, standing, and adding features, contrast (such as synonyms and antonyms), etc., so that the "Troxler fading effect" is avoided, and the concentration of training is maintained, thus enabling continuous stimulation to the brain, well maintaining training of the divergent fusional ability for far longer time, and achieving the training purpose efficiently. It should be noted that the important function of peripheral vision is to identify and distinguish common structures, similar forms, and actions taking place in the visual background. The central vision and peripheral vision together constitute the panoramic and detailed visual field seen by eyes every day.

Because of the mostly spherical shape of the eye and the relationship between the pupil size and the relative positions of the lens and the peripheral retina in daily life, the peripheral retina clinically making an important contribution to the overall vision, refers to the range (about 25 degrees to 60 degrees) before and after the equator of the eye (about 43 degrees). Because peripheral hyperopic defocus at peripheral retina can also induce and accelerate the formation and progress of myopia, weakening or correcting peripheral hyperopic defocus can help to inhibit the formation of pseudomyopia and true myopia.

Therefore, FIGS. 4A-4G show an embodiment of peripheral vision training for the unilateral visual field range based on the peripheral central training visual targets.

In this embodiment, the distance between the central training visual targets 300 is 2-30 mm larger than the primary eye position. The peripheral training visual targets A and B move from the position of 25 degrees to 60 degrees on the temporal side of the visual field of each eye with reference to the central training visual targets in the binocular single vision state.

Figure 4A:
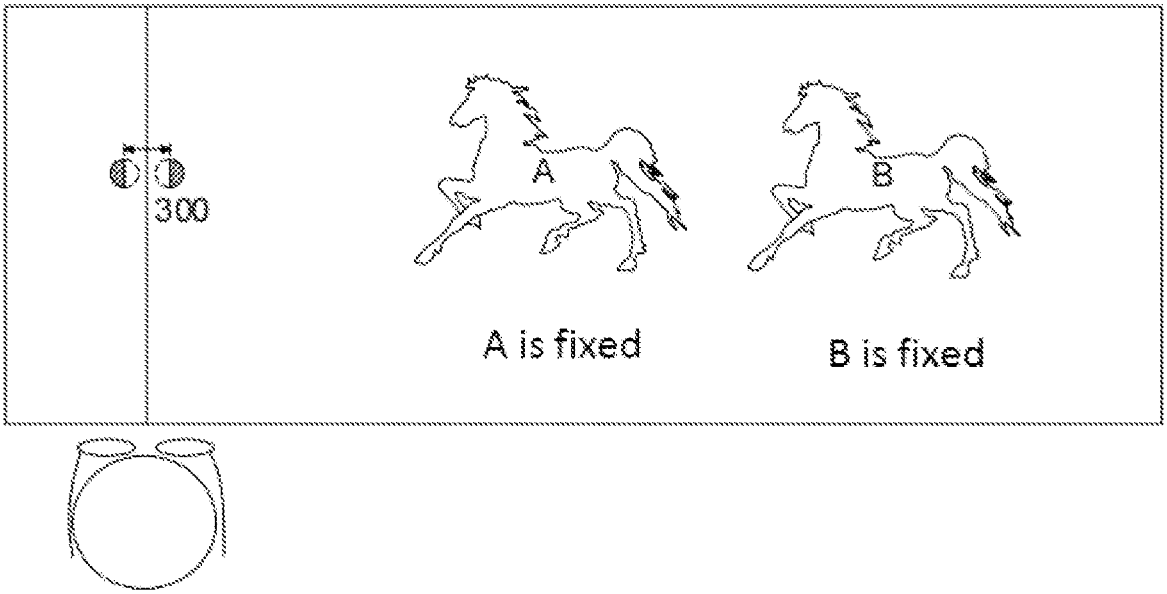
FIG. 4A is a schematic diagram showing that peripheral training visual targets A and B are at fixed positions.

FIG. 4A shows the situation that the peripheral training visual targets A and B are fixed.

Figure 4B:
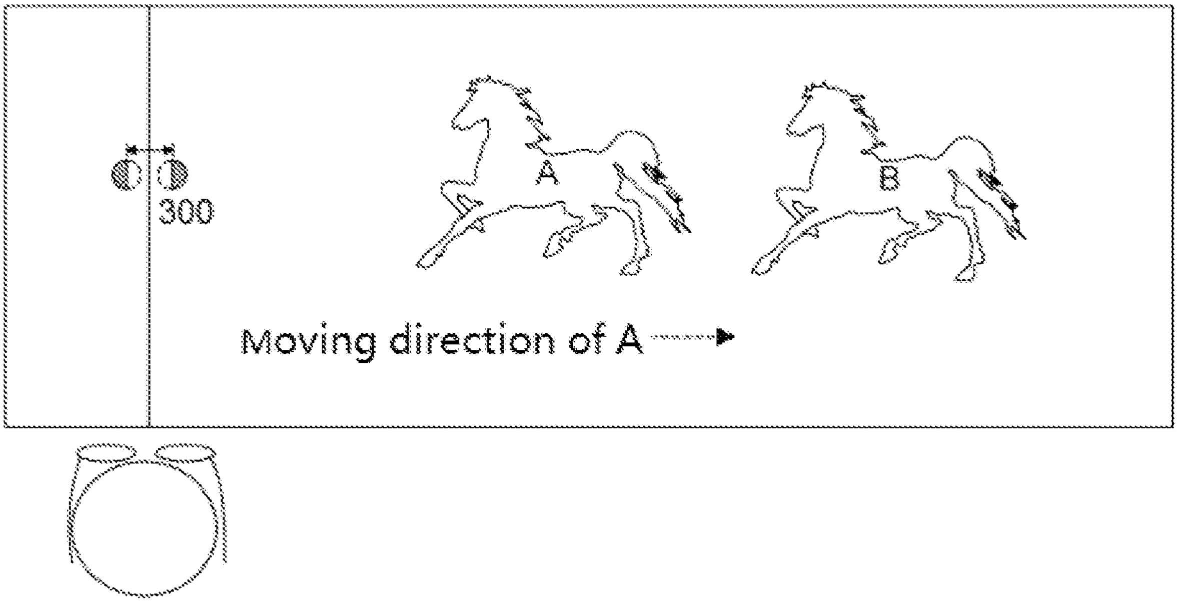
FIGS. 4B to 4D are schematic diagrams showing that a peripheral training visual target B is at a fixed position, a peripheral training visual target A starts moving towards B, and the peripheral training visual target A stops moving when the peripheral training visual targets A and B are overlapped.
Figure 4C:
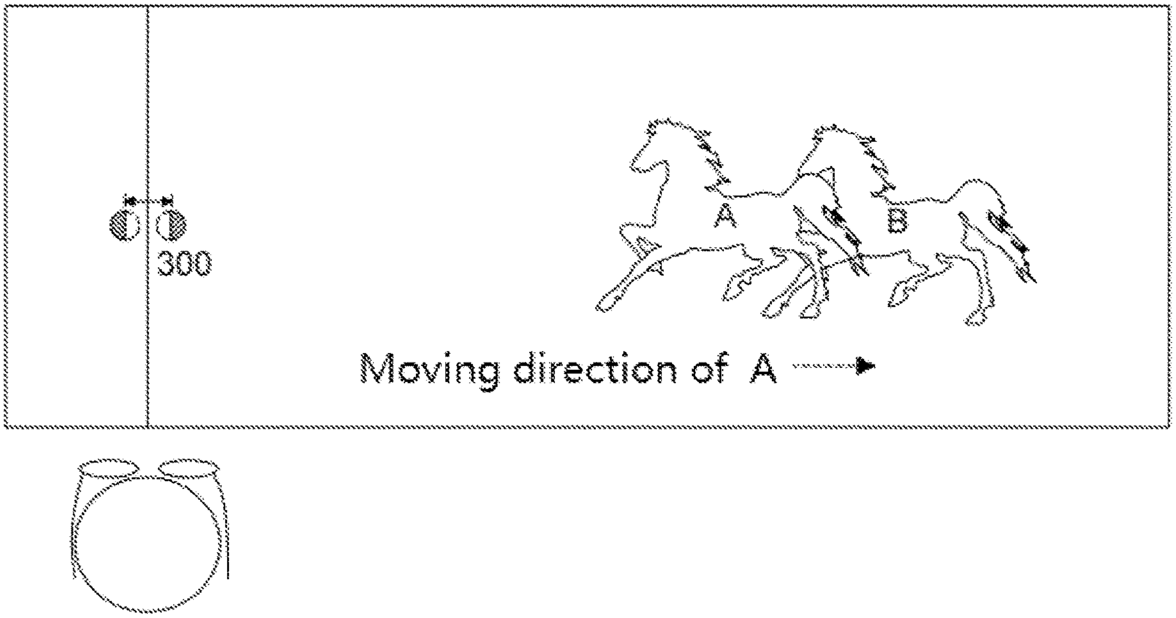
Figure 4D:
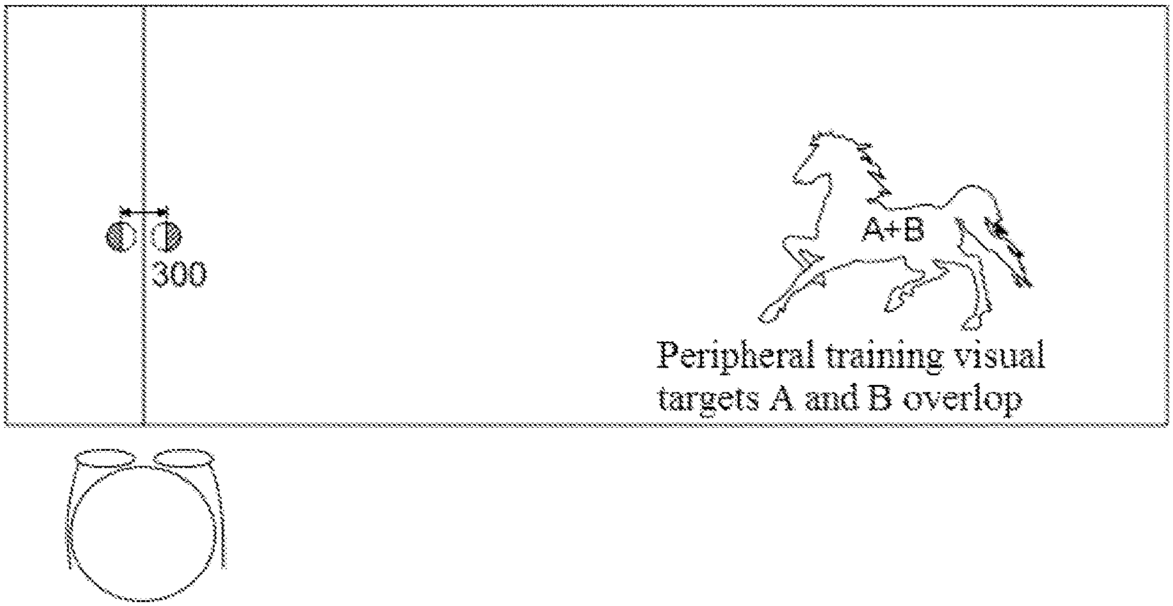

FIGS. 4B to 4D show the situation that the peripheral training visual target B is fixed, the peripheral training visual target A moves to B, and A stops moving when A and B overlap.

Figure 4E:
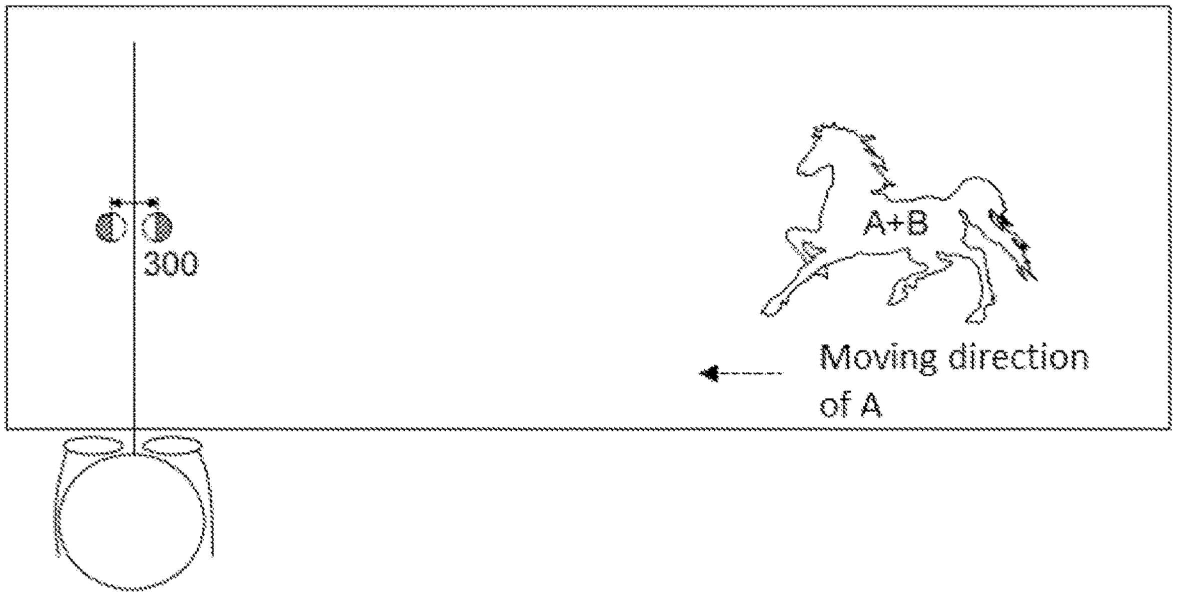
FIGS. 4E to 4G are schematic diagrams showing that a peripheral training visual target A moves away from a peripheral training visual target B in a reverse direction, and stops when it reaches the starting position.
Figure 4F:
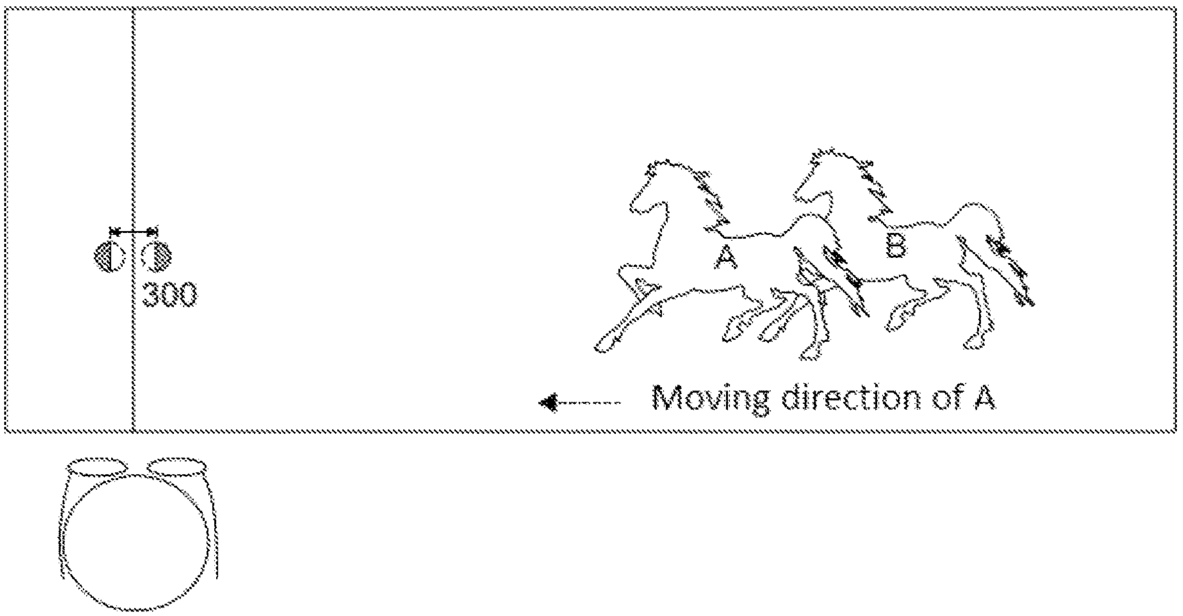
Figure 4G:
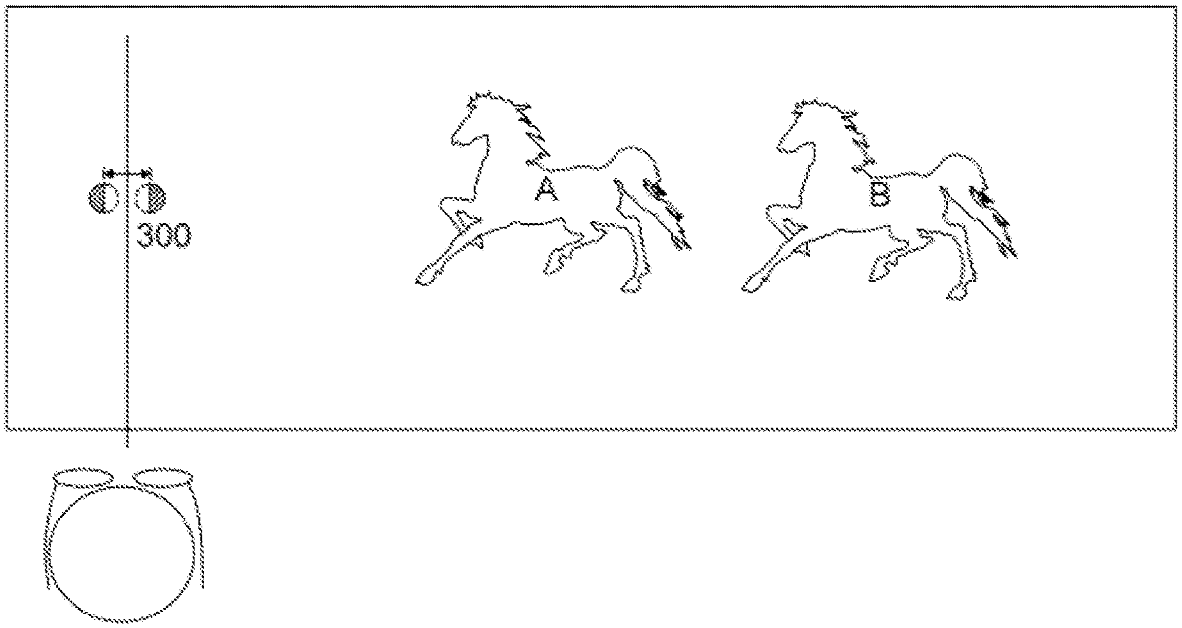

FIGS. 4E to 4G show the situation that the peripheral training visual target A moves away from the training visual target B in the opposite direction, and the peripheral training visual target A stops moving when it reaches the starting position.

The above specially designed peripheral training visual targets A and B can have the following characteristics.

(1) The background color of the peripheral training visual target: gray.

(2) The color of the peripheral training visual target: matte black graphics, such as cartoon patterns of horses.

(3) The position of the peripheral training visual target: at the position of 25 degrees to 60 degrees on the temporal side of the visual field of each eye.

(4) The size of the peripheral training visual target: 16 times that of the central training visual targets.

(5) The static and dynamic moving modes of the peripheral training visual target: when the central training visual targets is at the position which is 2-30 mm (not limited to 2-30 mm) larger than the pupil distance of the primary eye position, and the binocular single vision state is obtained.

The present disclosure can be realized by a complete set of application software. This software can be installed on a computer, a mobile phone or a tablet computer etc. The trainee can freely choose the content to be trained by operating directly on interactive terminals, and train by watching the training visual targets on computer screen, TV screen or projection screen etc. During the training process, the visual target and background music can be changed according to actual needs.

There are two versions of applications: online APP and offline APP.

By means of the set of special training methods, the following purpose can be achieved efficiently.

Because each single eye can only see the visual target that only appears on its temporal side, in order to receive, process and obtain the wanted binocular single vision and 3D stereoscopic vision, the brain vision center will make use of its visual divergent fusional ability, the Herring's law and the Sherrington's law to command the brain stem to achieve the following effects.

1. The center of the near-reflex pathway in midbrain is controlled and inhibited, so that it is difficult to be activated.

2. The ciliary muscle contraction and/or spasm are reversed and prevented, thus keeping it relaxed as much as possible.
3. The lens surface radian and the anterior-posterior diameter are returned to the neutral state without additional accommodation, thus eliminating unnecessary and unwanted accommodation.
4. To obtain and maintain binocular single vision on seeing and following bilateral temporal visual field targets during training, the brain stem extraocular muscle nuclei are instructed, according to the Herring's law and Sherrington's law to stimulate, activate and strengthen the temporal visual field related abducent and vertical recti extraocular muscles of both eyes and strengthen their muscle tones, but inhibit the nasal visual field related adductive and oblique extraocular muscles of both eyes and weaken their muscle tones.
5. The subnormal eyesight is improved, pseudomyopia is reversed and eliminated, the progression of true myopia is reduced or slowed down or, stopped, as well as the myopia associated excessive extension of the eye's axial length is avoided or stopped.
6. The adverse changes of the eye structure caused is significantly reduced by increasing accommodation and myopia progression, thus reducing future risk of ocular complications, especially the retina, such as retinal break, retinal tear, retinal detachment, retinal hemorrhage, vitreous hemorrhage, choroidal neovascular proliferation, glaucoma etc.

The basic concepts have been described above. Obviously, for those of ordinary skill in the art, the above disclosure is only an example, and does not constitute the limitation of the present disclosure. Although not explicitly described here, those of ordinary skill in the art may make various modifications, improvements and amendments to the present disclosure. Such modifications, improvements and amendments are suggested in the present disclosure, so that the modifications, improvements and amendments still belong to the spirit and scope of the exemplary embodiment of the present disclosure.

Meanwhile, the present disclosure uses specific words to describe the embodiments of the present disclosure. For example, "one embodiment", "an embodiment" and/or "some embodiments" mean a certain feature, structure or characteristic related to at least one embodiment of the present disclosure. Therefore, it should be emphasized and noted that references to "an embodiment" or "one embodiment" or "an alternative embodiment" for two or more times in different places in this specification do not necessarily refer to the same embodiment. In addition, some features, structures or characteristics in one or more embodiments of the present disclosure can be appropriately combined.

Some aspects of the present disclosure may be completely executed by hardware or software (including firmware, resident software, microcode, etc.), or executed by a combination of hardware and software. All the above hardware or software can be referred to as "data block", "module", "engine", "unit", "component" or "system". The processor may be one or more application specific integrated circuits (ASICs), digital signal processors (DSPs), digital signal processing devices (DAPDs), programmable logic devices (PLDs), field programmable gate arrays (FPGAs), processors, controllers, microcontrollers, microprocessors or combinations thereof. Furthermore, aspects of the present disclosure may be embodied as a computer product in one or more computer-readable media, which comprises a computer-readable program code. For example, the computer-readable media may include, but are not limited to, magnetic storage devices (e.g., hard disks, floppy disks, magnetic tapes, . . . ), optical disks (e.g., compact disks CDs, digital versatile disks DVDs, . . . ), smart cards, and flash memory devices (e.g., cards, sticks, key drives, . . . ).

A computer-readable medium may contain a propagation data signal containing a computer program code, such as at baseband or as part of a carrier wave. The propagation signal may have various forms, including an electromagnetic form, an optical form, etc., or a suitable combination form. The computer-readable medium can be any computer-readable medium other than a computer-readable storage medium, which can be connected to an instruction execution system, apparatus or device to realize communication, propagation or transmission of programs for use. The program code located on the computer-readable medium can be propagated through any suitable medium, including radios, cables, optical fiber cables, radio frequency signals, or similar media, or any combination of the above media.

The basic concepts have been described above. Obviously, for those skilled in the art, the above disclosure is only an example, and does not constitute the limitation of the present disclosure. Although not explicitly described here, those skilled in the art may make various modifications, improvements and amendments to the present disclosure. Such modifications, improvements and amendments are suggested in the present disclosure, so that the modifications, improvements and amendments still belong to the spirit and scope of the exemplary embodiment of the present disclosure.

Meanwhile, the present disclosure uses specific words to describe the embodiments of the present disclosure. For example, "one embodiment", "an embodiment" and/or "some embodiments" mean a certain feature, structure or characteristic related to at least one embodiment of the present disclosure. Therefore, it should be emphasized and noted that references to "an embodiment" or "one embodiment" or "an alternative embodiment" for two or more times in different places in this specification do not necessarily refer to the same embodiment. In addition, some features, structures or characteristics in one or more embodiments of the present disclosure can be appropriately combined.

In the same way, it should be noted that in order to simplify the expression disclosed in the present disclosure and help to understand one or more embodiments of the present disclosure, in the previous description of the embodiments of the present disclosure, various features are sometimes combined into one embodiment, drawings or descriptions thereof. However, the disclosure method does not mean that the object of the present disclosure needs more features than those mentioned in the claims. In fact, the features of the embodiment are less than all the features of a single embodiment disclosed above.

In some embodiments, numbers describing the number of ingredients and attributes are used. It should be understood that such numbers used in the description of embodiments are modified by the modifiers "about", "approximately" or "substantially" in some examples. Unless otherwise specified, "about", "approximately" or "substantially" means that the number allows a variation of plus or minus 20%. Accordingly, in some embodiments, the numerical parameters used in the specification and claims are approximate values, which can be changed according to the desired characteristics of individual embodiments. In some embodiments, the numerical parameters should take the specified significant digits into account and adopt the method of general digit reservation. Although the numerical fields and parameters used to confirm the range and breadth in some embodiments of the present disclosure are approximate values, in specific embodiments, such numerical values are set as accurately as possible within the feasible range.

Although the present disclosure has been described with reference to the current specific embodiments, those skilled in the art should realize that the above embodiments are only used to illustrate the present disclosure, and various equivalent changes or substitutions can be made without departing from the spirit of the present disclosure. Therefore, as long as the changes and modifications of the above embodiments are within the true spirit scope of the present disclosure, they will fall within the scope of the claims of the present disclosure.

What is claimed is:

1. A training method for eyesight correction of a trainee, implemented by using an eyesight training device, wherein the eyesight training device comprises: a binocular visual-field separation device, comprising a double-separation plate assembly and an adjustable unit, wherein the double-separation plate assembly comprises two separation plates which are movably connected to each other and form an included angle, and the adjustable unit is used for adjusting the included angle between the two separation plates; and a display screen, wherein the double-separation plate assembly separates the display screen into a left visual field and a right visual field, wherein Step 1, setting a distance between the two separation plates at a near-screen side according to a primary eye position of a trainee;

Step 2, providing at least one movable central training visual target on each of left and right sides of the separated display screen, wherein at least one central training visual target is located at a position with separation 2-30 mm larger than a pupil distance at the primary eye position;

Step 3, providing at least a first peripheral training visual target and a second peripheral training visual target at a position of 25 degrees to 60 degrees in a temporal visual field of the trainee on each of left and right sides of the display screen;

Step 4, moving the less temporal first peripheral training visual target to the more temporal second peripheral training visual target;

Step 5, returning the first peripheral training visual target to its initial position along its original path when a brain visual center of the trainee percepts that an image of the first peripheral training visual target and an image of the second peripheral training visual target overlap;

Step 6, repeating above steps 1 to 5 for at least two times;

wherein a separation distance between left and right central training visual targets at a beginning of training is 2-30 mm larger than the pupil distance at the primary eye position.

2. The training method according to claim 1, wherein the position of 25 degrees to 60 degrees in the temporal visual field of the trainee is relatively temporal to a visual axis angle of the primary eye position.

3. The training method according to claim 2, wherein a background color of the first peripheral training visual target and the second peripheral training visual target comprises gray, and a color of the first peripheral training visual target and the second peripheral training visual target comprises matte black.

4. The training method according to claim 3, wherein A size of each of the first peripheral training visual target and the second peripheral training visual target is at least 16 times of a size of the at least one central training visual target.

5. The training method according to claim 1, wherein the double-separation plate assembly comprises a training side and a near-screen side, the training side is arranged on a side of the double-separation plate assembly where the two separation plates are movably connected to each other, the near-screen side is a side which is opposite to the training side, and the near-screen side is close to the display screen to separate the left visual field and the right visual field.

6. The training method according to claim 5, wherein the adjustable unit is arranged between the two separation plates at the near-screen side, and comprises an adjustable knob and an adjustable telescopic bracket, wherein the adjustable telescopic bracket is telescopically connected with the two separation plates, and the included angle between the two separation plates is telescopically adjusted by the adjustable knob.

7. The training method according to claim 6, wherein the training side further comprises any one of a forehead support and a chin support, and a distance between the training side and the display screen is ≥45 cm.

8. The training method according to claim 7, wherein a color of the double-separation plate assembly is matte carbon black.

* * * * *